United States Patent
Wang et al.

(10) Patent No.: US 9,658,497 B2
(45) Date of Patent: May 23, 2017

(54) LIQUID CRYSTAL DISPLAY AND DISPLAY DEVICE

(71) Applicant: BOE TECHNOLOGY GROUP CO., LTD., Beijing (CN)

(72) Inventors: Xiaolin Wang, Beijing (CN); Haiyan Wang, Beijing (CN); Yoonsung Um, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/422,766

(22) PCT Filed: Jun. 3, 2014

(86) PCT No.: PCT/CN2014/079060
§ 371 (c)(1),
(2) Date: Feb. 20, 2015

(87) PCT Pub. No.: WO2015/090012
PCT Pub. Date: Jun. 25, 2015

(65) Prior Publication Data
US 2016/0033827 A1 Feb. 4, 2016

(30) Foreign Application Priority Data

Dec. 19, 2013 (CN) .......................... 2013 1 0704598

(51) Int. Cl.
*G02F 1/1343* (2006.01)
*G02F 1/1362* (2006.01)
*G02F 1/1335* (2006.01)
(52) U.S. Cl.
CPC .. *G02F 1/134309* (2013.01); *G02F 1/133528* (2013.01); *G02F 1/136213* (2013.01)
(58) Field of Classification Search
CPC .............................................. G02F 1/134309
See application file for complete search history.

(56) References Cited

U.S. PATENT DOCUMENTS

2009/0103033 A1 4/2009 Chen et al.
2013/0093988 A1 4/2013 Suzuki et al.
(Continued)

FOREIGN PATENT DOCUMENTS

CN 1837901 A 9/2006
CN 101424804 A 5/2009
(Continued)

OTHER PUBLICATIONS

Office Action issued in Chinese Application No. 201310704598.8 dated Oct. 23, 2014.
(Continued)

*Primary Examiner* — Michael Caley
*Assistant Examiner* — Edmond Lau
(74) *Attorney, Agent, or Firm* — Nath, Goldberg & Meyer; Joshua B. Goldberg; Scott H. Blackman (57) ABSTRACT

The present invention discloses a liquid crystal display panel and a display device. A capacitance compensation portion is arranged using a shading region, and the capacitance compensation portion is arranged opposite to a portion of a common electrode located within the shading region. Compared to the case where a common electrodes and a pixel electrode are overlapped only in a light transmitting region, the present invention enlarges the overlap area of the pixel electrode and the common electrode in the shading region, compensates the storage capacitance between the pixel electrode and the common electrode, and reduces the voltage difference before and after jump of the voltage of the pixel electrode, and improves the flicker of a liquid crystal display panel. Moreover, as the capacitance compensation portions additionally provided in the pixel electrodes are located within the shading region, the aperture rate of pixel regions will not be influenced.

17 Claims, 6 Drawing Sheets

(56) References Cited

U.S. PATENT DOCUMENTS

| | | | | |
|---|---|---|---|---|
| 2013/0314637 | A1* | 11/2013 | Hirosawa | G02F 1/136286 |
| | | | | 349/46 |
| 2014/0098334 | A1* | 4/2014 | Kimura | G02B 6/0051 |
| | | | | 349/138 |
| 2014/0104507 | A1* | 4/2014 | Yamazaki | G02F 1/13338 |
| | | | | 349/12 |

FOREIGN PATENT DOCUMENTS

| | | | |
|---|---|---|---|
| CN | 101424841 | A | 5/2009 |
| CN | 101874226 | A | 10/2010 |
| CN | 101988997 | A | 3/2011 |
| CN | 102053439 | A | 5/2011 |
| CN | 102289114 | A | 12/2011 |
| CN | 103676359 | A | 3/2014 |

OTHER PUBLICATIONS

Office Action issued in Chinese Application No. 201310704598.8 dated Apr. 28, 2015.
International Patent Application No. PCT/CN2014/079060, International Search Report dated, Sep. 29, 2014, fourteen (14) pages.

* cited by examiner

LIQUID CRYSTAL DISPLAY AND DISPLAY DEVICE

This is a National Phase Application filed under 35 U.S.C. 371 as a national stage of PCT/CN2014/079060, filed Jun. 3, 2014, and claims priority benefit from Chinese Application No. 201310704598.8, filed Dec. 19, 2013, the content of each of which is hereby incorporated by reference in its entirety.

FIELD OF THE INVENTION

The present invention relates to the field of display technology, and particularly to a liquid crystal display panel and a display device.

BACKGROUND OF THE INVENTION

Figure 1:
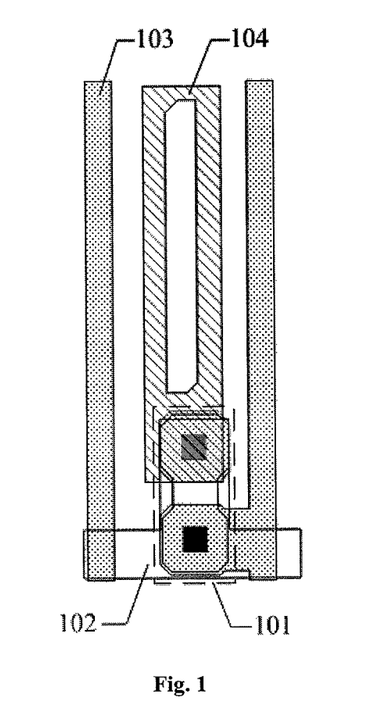
FIG. 1 is a top view of an array substrate in a liquid crystal display panel in the prior art.

A liquid crystal display panel mainly consists of an opposite substrate, an array substrate, and a liquid crystal layer located between the two substrates. Specifically, as shown in FIG. 1, a thin film transistor (TFT) 101, a gate line 102, a data line 103 and a pixel electrode 104 are arranged on the array substrate, wherein the gate of the thin film transistor 101 is connected to the gate line 102, the source thereof is connected to the data line 103, while the drain thereof is connected to the pixel electrode 104. A black matrix, color resin, a common electrode and the like are arranged on the opposite substrate.

At present, to acquire liquid crystal display panels with higher resolution, the resolution of a liquid crystal display panel is generally improved by reducing the area of the pixel electrode, so that the overlap area of the pixel electrode and the common electrode will be reduced, and thus the storage capacitance between the pixel electrode and the common electrode becomes smaller. It can be inferred from the formula $$\Delta V_P = \frac{(V_{gh} - V_{gl}) \times C_{gs}}{C_{gs} + C_{lc} + C_s}$$

(wherein $\Delta V_P$ is the voltage difference between moments before and after the jump of the voltage of a pixel electrode at the moment when a gate signal is from an on state to an off state, $V_{gh}$ is the gate voltage when the gate signal is at the on state, $V_{gl}$ is the gate voltage when the gate signal is at the off state, $C_{gs}$ is the capacitance between a gate line and a source, $C_{lc}$ is the capacitance between the pixel electrode and liquid crystal molecules and $C_s$ is the storage capacitance between the pixel electrode and the common electrode) that the decrease of the storage capacitance $C_s$ between the pixel electrode and the common electrode will increase the voltage difference $\Delta V_P$ between the moments before and after the jump of the voltage of the pixel electrode and thus make the liquid crystal display panel have the problem of serious flickers.

In addition, an active layer of the thin film transistor located on the array substrate may be manufactured from oxide or polycrystalline silicon. When the active layer is manufactured from oxide, the capacitance $C_{gs}$ between the gate line and the source will become larger. It can be inferred from the above formula that the larger capacitance $C_{gs}$ between the gate line and the source will also make the voltage difference $\Delta V_P$ between moments before and after the jump of the voltage of the pixel electrode become larger, so that the liquid crystal display panel will also have the problem of serious flickers.

Therefore, how to reduce the voltage difference between moments before and after the jump of the voltage of a pixel electrode and thus to improve the flicker of a liquid crystal display panel is a technical problem to be solved by those skilled in the art.

SUMMARY OF THE INVENTION

In view of this, embodiments of the present invention provides a liquid crystal display panel and a display device, which are used for reducing the voltage difference between moments before and after the jump of the voltage of pixel electrodes, and improves the flicker of a liquid crystal display panel.

Therefore, the embodiments of the present invention provide a liquid crystal display panel having a plurality of pixel regions arranged in an array, each of the pixel regions being divided into a light transmitting region and a shading region, each of the pixel regions being provided with a common electrode and a pixel electrode;

within at least one of the pixel regions, the pixel electrode has a capacitance compensation portion which is located within the shading region and arranged opposite to a portion of the common electrode located within the shading region.

In the liquid crystal display panel provided by the embodiments of the present invention, a capacitance compensation portion is arranged by using a shading region, and the capacitance compensation portion is arranged opposite to a portion of a common electrode located within the shading region. In comparison to the case where a common electrode and a pixel electrode are overlapped only in a light transmitting region in the prior art, the present invention increases the overlap area of the pixel electrode and the common electrode in a shading region, correspondingly compensates the storage capacitance between the pixel electrode and the common electrode, and thus reduces the voltage difference between moments before and after the jump of the voltage of the pixel electrodes, and improves the flicker of a liquid crystal display panel. Moreover, as the capacitance compensation portions additionally provided in the pixel electrode are located within the shading region, the aperture rate of pixel region will not be influenced.

The liquid crystal display panel provided by the embodiments of the present invention specifically includes an opposite substrate, an array substrate, a liquid crystal layer located between the opposite substrate and the array substrate, a first polarizer located on one side of the opposite substrate back away from the liquid crystal layer, and a second polarizer located on one side of the array substrate back away from the liquid crystal layer;

specifically, the liquid crystal layer consists of positive liquid crystal molecules, and a direction of a long axis of the positive liquid crystal molecules at an initial state is parallel to the opposite substrate and the array substrate; or, the liquid crystal layer consists of negative liquid crystal molecules, and a direction of a short axis of the negative liquid crystal molecules at an initial state is parallel to the opposite substrate and the array substrate;

the pixel electrode is located on one side of the array substrate facing the liquid crystal layer; and the common electrode is located on one side of the array substrate or the opposite substrate facing the liquid crystal layer.

Specifically, the liquid crystal display panel provided by the embodiments of the present invention may be in a normally-black mode, and a direction of a light transmitting axis of the first polarizer is vertical to a direction of a light transmitting axis of the second polarizer.

Further, in order to reduce the light leakage resulted from the rotation of the long axis of positive liquid crystal molecules due to an electric field between two adjacent edges of the capacitance compensation portions of the pixel electrodes, within two adjacent pixel regions, an angle formed by projections of two adjacent edges of the capacitance compensation portions of the pixel electrodes on the array substrate and a projection of the long axis of the positive liquid crystal molecules on the array substrate is greater than 0°; or in order to reduce the light leakage resulted from the rotation of the short axis of negative liquid crystal molecules due to an electric field between two adjacent edges of the capacitance compensation portions of the pixel electrodes, within two adjacent pixel regions, an angle formed by projections of two adjacent edges of the capacitance compensation portions of the pixel electrodes on the array substrate and a projection of the short axis of the negative liquid crystal molecules on the array substrate is greater than 0°.

Preferably, in order to further reduce the light leakage resulted from the rotation of the long axis of positive liquid crystal molecules due to an electric field between two adjacent edges of the capacitance compensation portions of the pixel electrodes, in each column of the pixel regions or each row of the pixel regions, the projections of two adjacent edges of the capacitance compensation portions of the pixel electrodes on the array substrate are vertical to the projection of the long axis of the positive liquid crystal molecules on the array substrate; or in order to further reduce the light leakage resulted from the rotation of the short axis of negative liquid crystal molecules due to an electric field between two adjacent edges of the capacitance compensation portions of the pixel electrodes, in each column of the pixel regions or each row of the pixel regions, the projections of two adjacent edges of the capacitance compensation portions of the pixel electrodes on the array substrate are vertical to the projection of the short axis of the negative liquid crystal molecules on the array substrate.

Specifically, the liquid crystal display panel provided by the embodiments of the present invention may be in a normally-white mode, and a direction of the light transmitting axis of the first polarizer is parallel to a direction of the light transmitting axis of the second polarizer.

Further, in order to reduce the light leakage by rotating the long axis of the positive liquid crystal molecules using the electric field between two adjacent edges of the capacitance compensation portions of the pixel electrodes, within two adjacent pixel regions, the angle formed by projections of two adjacent edges of the capacitance compensation portions of the pixel electrodes on the array substrate and a projection of the long axis of the positive liquid crystal molecules on the array substrate is greater than or equal to 0° but less than 90°; or in order to reduce the light leakage by rotating the short axis of the negative liquid crystal molecules using the electric field between two adjacent edges of the capacitance compensation portions of the pixel electrodes, within two adjacent pixel regions, the angle formed by projections of two adjacent edges of the capacitance compensation portions of the pixel electrodes on the array substrate and a projection of the short axis of the negative liquid crystal molecules on the array substrate is greater than or equal to 0° but less than 90°.

Preferably, in order to further reduce the light leakage by rotating the long axis of the positive liquid crystal molecules using the electric field between two adjacent edges of the capacitance compensation portions of the pixel electrodes, in each column of the pixel regions or each row of the pixel regions, the projections of two adjacent edges of the capacitance compensation portions of the pixel electrodes on the array substrate are parallel to the projection of the long axis of the positive liquid crystal molecules on the array substrate; or in order to further reduce the light leakage by rotating the short axis of the negative liquid crystal molecules using the electric field between two adjacent edges of the capacitance compensation portions of the pixel electrodes, in each column of the pixel regions or each row of the pixel regions, the projections of two adjacent edges of the capacitance compensation portions of the pixel electrodes on the array substrate are parallel to the projection of the short axis of the negative liquid crystal molecules on the array substrate.

Most preferably, in the above liquid crystal display panel provided by the embodiments of the present invention, in order to reduce the light leakage to the largest extent, within two adjacent pixel regions, two adjacent edges of the capacitance compensation portions of the pixel electrodes have complementary patterns.

The embodiments of the present invention further provide a display device, including the above liquid crystal display panel provided by the embodiments of the present invention.

DETAILED DESCRIPTION OF THE EMBODIMENTS

The specific implantations of the liquid crystal display panel and display device provided by the embodiments of the present invention will be described below in detail in conjunction with the accompanying drawings.

The shape and thickness of each film layer in the accompanying drawings do not reflect the real scale of the array substrate or the opposite substrate and are merely used for illustratively describing the content of the present invention.

The liquid crystal display panel provided by the embodiments of the present invention has a plurality of pixel regions arranged in an array. Each of the pixel regions is divided into a light transmitting region and a shading region and has a common electrode and a pixel electrode.

Figure 2:
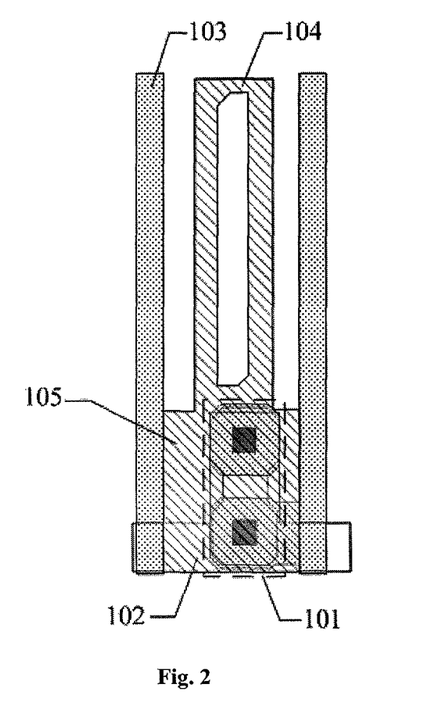
FIG. 2 is a first top view of an array substrate in a liquid crystal display panel provided by an embodiment of the present invention.

Within at least one pixel region, as shown in FIG. 2, the pixel electrode 104 has a capacitance portion 105 which is located within the shading region and arranged opposite to a portion of the common electrode located within the shading region.

Generally, as shown in FIG. 2, one pixel region is formed by a region surrounded by two adjacent data lines 103 and gate lines 102, and each of the pixel regions is divided into a light transmitting region and a shading region, wherein the area ratio of the light transmitting region to the shading region defines the aperture rate of the pixel region. In the prior art, the pixel electrode 104 is generally arranged in the light transmitting region only, the data lines 103 apply gray scale signals to the pixel electrode 104 via the thin film transistor 101, and the common electrode not shown in FIG. 2 is generally arranged within the whole pixel region.

In the liquid crystal display panel provided by the embodiment of the present invention, a capacitance compensation portion 105 is additionally provided in the shading region, and the capacitance compensation portion 105 is opposing to a portion of the common electrode located within the shading region. Therefore, in comparison to the case where the common electrode and the pixel electrode 104 are overlapped only in a light transmitting region in the prior art, the present invention increases the overlap area of the pixel electrode and the common electrode 104 in the shading region, correspondingly increases the storage capacitance between the pixel electrode 104 and the common electrode, and thus reduces the voltage difference between moments before and after the jump of the voltage of the pixel electrode 104, and improves the flicker of a liquid crystal display panel.

Moreover, as the capacitance compensation portion 105 additionally provided in the pixel electrode 104 is located within the shading region, the aperture rate of pixel regions will not be influenced.

Figure 3:
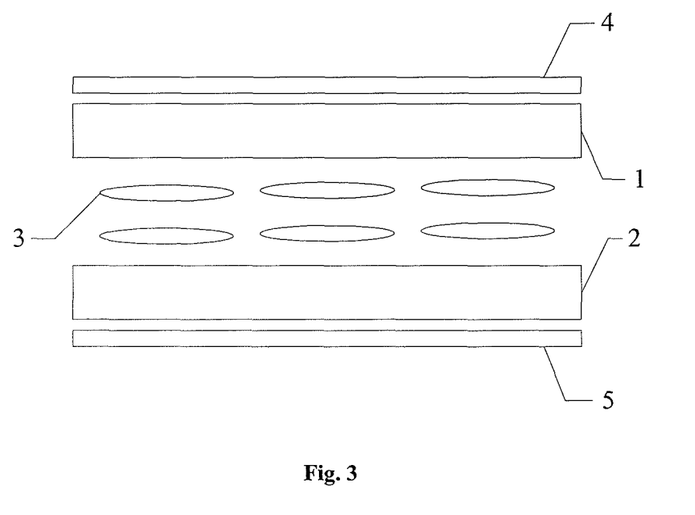
FIG. 3 is a structure diagram of a liquid crystal display panel provided by an embodiment of the present invention

As shown in FIG. 3, the liquid crystal display panel provided by the embodiment of the present invention specifically includes an opposite substrate 1, an array substrate 2, a liquid crystal layer 3 located between the opposite substrate 1 and the array substrate 2, a first polarizer 4 located on one side of the opposite substrate 1 back away from the liquid crystal layer 3, and a second polarizer 5 located on one side of the array substrate 2 back away from the liquid crystal layer 3.

In this case, the liquid crystal layer 3 may consist of positive liquid crystal molecules, and a direction of a long axis of the positive liquid crystal molecules at an initial state is parallel to the opposite substrate 1 and the array substrate 2; or, the liquid crystal layer 3 may consist of negative liquid crystal molecules, and a direction of a short axis of the negative liquid crystal molecules at an initial state is parallel to the opposite substrate 1 and the array substrate 2.

During a specific implementation, the liquid crystal display panel provided by the embodiment of the present invention may be applied to Advanced Super Dimensional Field Switch (ADS) type liquid crystal display panels, where both the pixel electrode 104 and the common electrode are located on one side of the array substrate facing the liquid crystal; and it may also be applied to Twisted Nematic (TN) type liquid crystal display panels, where the pixel electrode 104 is located on one side of the array substrate facing the liquid crystal layer, while the common electrode is located on one side of the opposite substrate facing the liquid crystal layer.

During a specific implementation, the liquid crystal display panel provided by the embodiment of the present invention may be in a normally-black mode, where a direction of a light transmitting axis of the first polarizer 4 is vertical to a direction of a light transmitting axis of the second polarizer 5; and, the liquid crystal display panel may also be in a normally-white mode, where the direction of the light transmitting axis of the first polarizer 4 is parallel to the direction of the light transmitting axis of the second polarizer 5.

The case of the liquid crystal display panel provided by the embodiment of the present invention being in a normally-black mode will be described blow in detail.

Within two adjacent pixel regions, voltages applied to adjacent pixel electrodes by respective data lines may be different, so that there is a voltage difference between two adjacent edges of the respective capacitance compensation portions 105 of the adjacent pixel electrodes 104, and there will be a horizontal electric field between the two edges. When projections of the two edges on the array substrate 2 are parallel to projections of the liquid crystal molecules on the array substrate 2, the horizontal electric field between the two edges will allow the liquid crystal molecules near the edges to rotate at a large angle, so the backlight irradiated on the opposite substrate after passing the rotated liquid crystal molecules has a large component in the direction of the light transmitting axis of the first polarizer 4, and thus light leakage will be generated here. Although a black matrix is generally arranged on the opposite substrate 1 for shielding the shading region, it is possible to have fabrication errors during the cell alignment process of the array substrate 2 and the opposite substrate 1. Consequently, the edge of the shading region is not shielded by the black matrix, so that the light leakage cannot be avoided effectively, and the display quality of the liquid crystal display panel is influenced.

On this basis, when the liquid crystal display panel provided by the embodiment of the present invention is set in a normally-black mode, in order to avoid the light leakage, the edges of the capacitance compensation portions 105 of the pixel electrodes 104 are optimized.

Specifically, when the liquid crystal layer 3 consists of positive liquid crystal molecules, within two adjacent pixel regions, an angle formed by projections of two adjacent edges of the capacitance compensation portions 105 of the pixel electrodes 104 on the array substrate 2 and a projection of the long axis of the positive liquid crystal molecules on the array substrate 2 is greater than 0°.

Figure 4A:
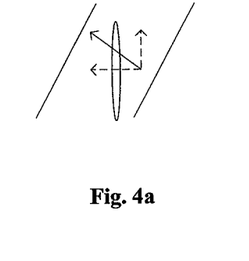
FIGS. 4a-4c are schematic diagrams showing applying an electric field to positive liquid crystal molecules when the liquid crystal display panel provided by the embodiment of the present invention is set to be in a normally-black mode.
Figure 4B:
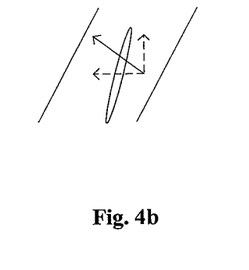

Specifically, as shown in FIG. 4a, within two adjacent pixel regions, when the angle formed by the projections (shown by two straight lines in FIG. 4a) of two adjacent edges of the capacitance compensation portions 105 of the pixel electrodes 104 on the array substrate 2 and the projection of the long axis of the positive liquid crystal molecules on the array substrate 2 is an acute angle, the long axis of the positive liquid crystal molecules is only subject to the action of a component of an electric field (shown by the arrow in FIG. 4a) vertical to the direction of the long axis of the positive liquid crystal molecules, and the long axis of the positive liquid crystal molecules will be rotated at a small angle only, as shown in FIG. 4b, so that the backlight irradiated on the opposite substrate 1 after passing the rotated liquid crystal molecules has a small component in the direction of the light transmitting axis of the first polarizer 4. Even if there are cell alignment errors, the backlight emitted from the first polarizer 4 may also be reduced, so that the light leakage is thus reduced.

Preferably, in each column of the pixel regions or each row of the pixel regions, the projections of two adjacent edges of the capacitance compensation portions 105 of the pixel electrodes 104 on the array substrate 2 are configured to be vertical to the projection of the long axis of the positive liquid crystal molecules on the array substrate 2.

Figure 4C:
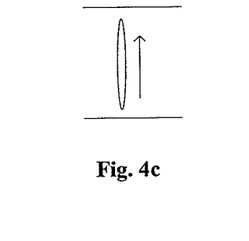

Specifically, as shown in FIG. 4c, in each column of the pixel regions or each row of the pixel regions, when the projections of two adjacent edges of the capacitance compensation portions 105 of the pixel electrodes 104 on the array substrate 2 are vertical to the projection of the long axis of the positive liquid crystal molecules on the array substrate 2, the long axis of the positive liquid crystal molecules will not be rotated under the action of the electric field, so that the polarization direction of the backlight irradiated on the opposite substrate 1 after passing the un-rotated positive liquid crystal molecules is vertical to the direction of the light transmitting axis of the first polarizer 4. Even if there are cell alignment errors, the backlight will not be emitted from the first polarizer 4, so that the light leakage is thus avoided.

Figure 5:
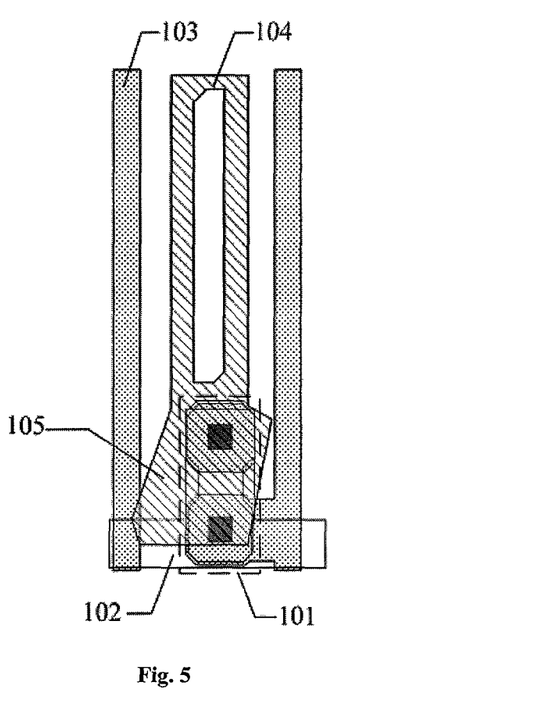
FIG. 5 is a second top view of an array substrate in a liquid crystal display panel provided by an embodiment of the present invention.

Most preferably, during design of the edges of the capacitance portions 105 of the pixel electrodes 104, as shown in FIG. 5, two adjacent edges of the capacitance portions 105 of the pixel electrodes 104 may be configured as complementary patterns. For example, the projection of the positive liquid crystal molecules on the array substrate 2 is vertical to a portion of the projection of a pair of adjacent edges of the capacitance compensation portions 105 on the array substrate 2, and an angle formed by the projection of the positive liquid crystal molecules on the array substrate 2 and another portion of the projection of the pair of edges on the array substrate 2 is an acute angle, so that the light leakage may be reduced to the largest extent.

Figure 6:
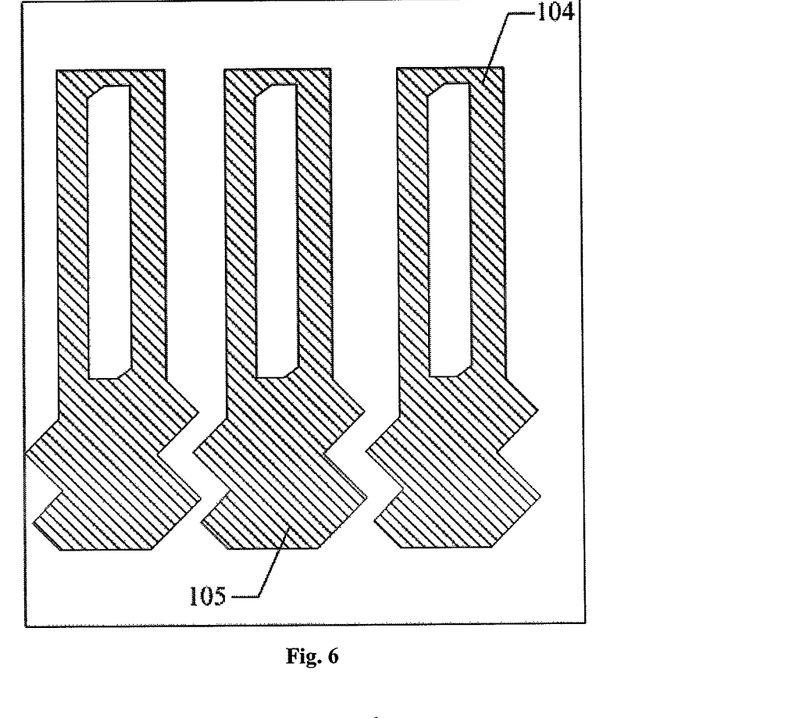
FIG. 6 is a structure diagram of a pixel electrode in the liquid crystal display panel provided by the embodiment of the present invention.

During a specific implementation, as shown in FIG. 6, the edges of the capacitance compensation portions 105 may also be configured as broken lines.

Similarly, when the liquid crystal layer 3 consists of negative liquid crystal molecules, in order to reduce the light leakage, within two adjacent pixel regions, an angle formed by the projections of two adjacent edges of the capacitance compensation portions 105 of the pixel electrodes 104 on the array substrate 2 and the projection of the short axis of the negative liquid crystal molecules on the array substrate 2 is greater than 0°. The specific principle is similar to the principle of the positive liquid crystal molecules, and will not be repeated here.

Preferably, in each column of the pixel regions or each row of the pixel regions, the projections of two adjacent edges of the capacitance compensation portions 105 of the pixel electrodes 104 on the array substrate 2 are configured to be vertical to the projection of the short axis of the negative liquid crystal molecules on the array substrate 2. The specific principle is similar to the principle of the positive liquid crystal molecules, and will not be repeated here.

Most preferably, two adjacent edges of the capacitance portions 105 of the pixel electrodes 104 may be configured as complementary patterns. The specific principle is similar to the principle of the positive liquid crystal molecules, and will not be repeated here.

The case of the liquid crystal display panel provided by the embodiment of the present invention being set in a normally-white mode will be described below in detail.

Within two adjacent pixel regions, the voltages applied to adjacent pixel electrodes by data lines may be different, so that there is a voltage difference between two adjacent edges of the respective capacitance compensation portions 105 of the adjacent pixel electrodes 104, and there will be a horizontal electric field between the two edges. When the projections of the two edges on the array substrate 2 are vertical to the projections of the liquid crystal molecules on the array substrate 2, the horizontal electric field between the two edges does not allow the liquid crystal molecules near the edges to rotate, so that the polarization direction of the backlight irradiated on the opposite substrate 1 after passing the un-rotated liquid crystal molecules will be parallel to the direction of the light transmitting axis of the first polarizer 4, and thus light leakage will be generated here. Although a black matrix is generally arranged on the opposite substrate 1 for shielding the shading region, it is possible to have fabrication errors during the cell alignment process of the array substrate 2 and the opposite substrate 1. Consequently, the edge of the shading region is not shielded by the black matrix, so that the light leakage cannot be avoided effectively, and the display quality of the liquid crystal display panel is influenced.

On this basis, when the liquid crystal display panel provided by the embodiments of the present invention is set in a normally-white mode, in order to avoid the light leakage, the edges of the capacitance compensation portions 105 of the pixel electrodes 104 are optimized.

Specifically, when the liquid crystal layer 3 consists of positive liquid crystal molecules, within two adjacent pixel regions, an angle formed by the projections of two adjacent edges of the capacitance compensation portions 105 of the pixel electrodes 104 on the array substrate 2 and the projection of the long axis of the positive liquid crystal molecules on the array substrate 2 is set to be greater than or equal to 0° but less than 90°.

Figure 7A:
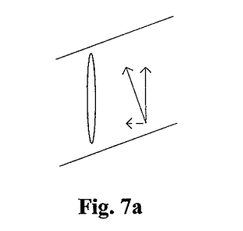
FIGS. 7a-7d are schematic diagrams showing applying an electric field to positive liquid crystal molecules when the liquid crystal display panel provided by the embodiment of the present invention is set to be in a normally-white mode.
Figure 7B:
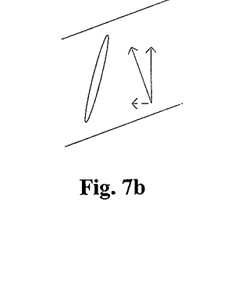

Specifically, as shown in FIG. 7a, within two adjacent pixel regions, when the angle formed by the projections of two adjacent edges of the capacitance compensation portions 105 of the pixel electrodes 104 on the array substrate 2 and the projection of the long axis of the positive liquid crystal molecules on the array substrate 2 is an acute angle, the long axis of the positive liquid crystal molecules is subject to the action of a component of an electric field vertical to the direction of the long axis of the positive liquid crystal molecules, and the long axis of the positive liquid crystal molecules may be rotated, as shown in FIG. 7b, so that the backlight irradiated on the opposite substrate 1 after passing the rotated positive liquid crystal molecules has a component in a direction vertical to the light transmitting axis of the first polarizer 4. Even if there are cell alignment errors, the backlight emitted from the first polarizer 4 may also be reduced, so that the light leakage is thus reduced.

Preferably, in each line of the pixel regions or each row of the pixel regions, the projections of two adjacent edges of the capacitance compensation portions 105 of the pixel electrodes 104 on the array substrate 2 are configured to be parallel to the projection of the long axis of the positive liquid crystal molecules on the array substrate 2.

Figure 7C:
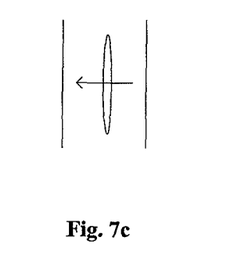
Figure 7D:
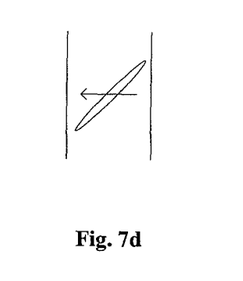

Specifically, as shown in FIG. 7c, in each column of the pixel regions or each row of the pixel regions, when the projections of two adjacent edges of the capacitance compensation portions 105 of the pixel electrodes 104 on the array substrate 2 are parallel to the projection of the long axis of the positive liquid crystal molecules on the array substrate 2, the long axis of the positive liquid crystal molecules will be rotated at a large angle under the action of the electric field, as shown in 7*d*, so that the polarization direction of the backlight irradiated on the opposite substrate 1 after passing the rotated positive liquid crystal molecules has a small component in the direction of the light transmitting axis of the first polarizer 4. Even if there are cell alignment errors, the backlight emitted from the first polarizer 4 will also be less, so that the light leakage is further reduced.

Most preferably, during design of the edges of the capacitance portions 105 of the pixel electrodes 104, as shown in FIG. 5, two adjacent edges of the capacitance portions 105 of the pixel electrodes 104 may be configured as complementary patterns. In this way, the projection of the positive liquid crystal molecules on the array substrate 2 is parallel to the projection of a pair of adjacent edges of the capacitance compensation portions 105 on the array substrate 2, and the angle formed by the projection of the positive liquid crystal molecules on the array substrate 2 and another pair of adjacent edges of the capacitance compensation portions 105 on the array substrate 2 is an acute angle, so that the light leakage may be reduced to the largest extent.

Mover over, during a specific implementation, as shown in FIG. 6, the edges of the capacitance compensation portions 105 may also be configured as broken lines.

Similarly, when the liquid crystal layer 3 consists of negative liquid crystal molecules, in order to reduce the light leakage, within two adjacent pixel regions, an angle formed by the projections of two adjacent edges of the capacitance compensation portions 105 of the pixel electrodes 104 on the array substrate 2 and the projection of the short axis of the negative liquid crystal molecules on the array substrate 2 is set to be greater than or equal to 0° but less than 90°. The specific principle is similar to the principle of the positive liquid crystal molecules, and will not be repeated here.

Preferably, in each line of the pixel regions or each row of the pixel regions, the projections of two adjacent edges of the capacitance compensation portions 105 of the pixel electrodes 104 on the array substrate 2 are configured to be parallel to the projection of the short axis of the negative liquid crystal molecules on the array substrate 2. The specific principle is similar to the principle of the positive liquid crystal molecules, and will not be repeated here.

Most preferably, two adjacent edges of the capacitance portions 105 of the pixel electrodes 104 may be configured as complementary patterns. The specific principle is similar to the principle of the positive liquid crystal molecules, and will not be repeated here.

Based on a same invention concept, an embodiment of the present invention further provide a display device, including the liquid crystal display panel provided by the embodiment of the present invention. The display device may be a mobile phone, a tablet computer, a TV set, a display, a notebook computer, a digital photo frame, a navigator or any product or component having a display function. The implementation of the display device may refer to the embodiments of the liquid crystal display panel, and will not be repeated here.

In the liquid crystal display panel and display device provided by the embodiments of the present invention, a capacitance compensation portion is arranged by using a shading region, and the capacitance compensation portion is arranged opposite to a portion of a common electrode located within the shading region. In comparison to the case where common electrodes and pixel electrodes are overlapped only in a light transmitting region in the prior art, the present invention increases the overlap area of pixel electrodes and common electrodes in the shading region, correspondingly compensates the storage capacitance between the pixel electrodes and the common electrodes, and thus reduces the voltage difference between moments before and after the jump of the voltage of the pixel electrodes, and improves the flicker of a liquid crystal display panel. Moreover, as the capacitance compensation portions additionally provided in the pixel electrodes are located within the shading region, the aperture rate of pixel regions will not be influenced either. In addition, optimal design of edges of the capacitance compensation portions of the pixel electrodes may reduce the light leakage of the liquid crystal display panel at the edges of the shading region.

Apparently, those skilled in the art may make various alterations and variations to the present invention without departing from the spirit and scope of the present invention. Accordingly, if these alternations and variations of the present invention fall within the scope of the claims of the present invention and equivalent technology thereof, the present invention is also intended to contain these alterations and variations.

The invention claimed is:

1. A liquid crystal display panel, having a plurality of pixel regions arranged in an array, each of the pixel regions being divided into a light transmitting region and a shading region, each of the pixel regions being provided with a common electrode and a pixel electrode, wherein
within at least one of the pixel regions, the pixel electrode has a capacitance compensation portion which extends in and occupies the shading region's entire area and is configured corresponding to a portion of the common electrode located within the shading region.

2. The liquid crystal display panel according to claim 1, comprising an opposite substrate, an array substrate, a liquid crystal layer located between the opposite substrate and the array substrate, a first polarizer located on one side of the opposite substrate back away from the liquid crystal layer, and a second polarizer located on one side of the array substrate back away from the liquid crystal layer, wherein
the liquid crystal layer consists of positive liquid crystal molecules, and a direction of a long axis of the positive liquid crystal molecules at an initial state is parallel to the opposite substrate and the array substrate; or, the liquid crystal layer consists of negative liquid crystal molecules, and a direction of a short axis of the negative liquid crystal molecules at an initial state is parallel to the opposite substrate and the array substrate;
the pixel electrode is located on one side of the array substrate facing the liquid crystal layer; and
the common electrode is located on one side of the array substrate or the opposite substrate facing the liquid crystal layer.

3. The liquid crystal display panel according to claim 2, wherein a direction of a light transmitting axis of the first polarizer is vertical to a direction of a light transmitting axis of the second polarizer.

4. The liquid crystal display panel according to claim 3, wherein in the case of the liquid crystal layer consisting of positive liquid crystal molecules, within two adjacent pixel regions, an angle formed by projections of two adjacent edges of the capacitance compensation portions of the pixel electrodes on the array substrate and a projection of the long axis of the positive liquid crystal molecules on the array substrate is greater than 0°; or in the case of the liquid crystal layer consisting of negative liquid crystal molecules, within two adjacent pixel regions, an angle formed by projections of two adjacent edges of the capacitance compensation portions of the pixel electrodes on the array substrate and a projection of the short axis of the negative liquid crystal molecules on the array substrate is greater than 0°.

5. The liquid crystal display panel according to claim 4, wherein in the case of the liquid crystal layer consisting of positive liquid crystal molecules, within two adjacent pixel regions, the projections of two adjacent edges of the capacitance compensation portions of the pixel electrodes on the array substrate are vertical to the projection of the long axis of the positive liquid crystal molecules on the array substrate; or in the case of the liquid crystal layer consisting of negative liquid crystal molecules, within two adjacent pixel regions, the projections of two adjacent edges of the capacitance compensation portions of the pixel electrodes on the array substrate are vertical to the projection of the short axis of the negative liquid crystal molecules on the array substrate.

6. The liquid crystal display panel according to claim 2, wherein a direction of the light transmitting axis of the first polarizer is parallel to a direction of the light transmitting axis of the second polarizer.

7. The liquid crystal display panel according to claim 6, wherein in the case of the liquid crystal layer consisting of positive liquid crystal molecules, within two adjacent pixel regions, the angle formed by projections of two adjacent edges of the capacitance compensation portions of the pixel electrodes on the array substrate and a projection of the long axis of the positive liquid crystal molecules on the array substrate is greater than or equal to 0° but less than 90'; or in the case of the liquid crystal layer consisting of negative liquid crystal molecules, within two adjacent pixel regions, the angle formed by projections of two adjacent edges of the capacitance compensation portions of the pixel electrodes on the array substrate and a projection of the short axis of the negative liquid crystal molecules on the array substrate is greater than or equal to 0° but less than 90°.

8. The liquid crystal display panel according to claim 7, wherein in the case of the liquid crystal layer consisting of positive liquid crystal molecules, within two adjacent pixel regions, the projections of two adjacent edges of the capacitance compensation portions of the pixel electrodes on the array substrate are parallel to the projection of the long axis of the positive liquid crystal molecules on the array substrate; or in the case of the liquid crystal layer consisting of negative liquid crystal molecules, within two adjacent pixel regions, the projections of two adjacent edges of the capacitance compensation portions of the pixel electrodes on the array substrate are parallel to the projection of the short axis of the negative liquid crystal molecules on the array substrate.

9. The liquid crystal display panel according to claim 1, wherein within two adjacent pixel regions, two adjacent edges of the capacitance compensation portions of the pixel electrodes have complementary patterns.

10. The liquid crystal display panel according to claim 2, wherein within two adjacent pixel regions, two adjacent edges of the capacitance compensation portions of the pixel electrodes have complementary patterns.

11. The liquid crystal display panel according to claim 3, wherein within two adjacent pixel regions, two adjacent edges of the capacitance compensation portions of the pixel electrodes have complementary patterns.

12. The liquid crystal display panel according to claim 4, wherein within two adjacent pixel regions, two adjacent edges of the capacitance compensation portions of the pixel electrodes have complementary patterns.

13. The liquid crystal display panel according to claim 5, wherein within two adjacent pixel regions, two adjacent edges of the capacitance compensation portions of the pixel electrodes have complementary patterns.

14. The liquid crystal display panel according to claim 6, wherein within two adjacent pixel regions, two adjacent edges of the capacitance compensation portions of the pixel electrodes have complementary patterns.

15. The liquid crystal display panel according to claim 7, wherein within two adjacent pixel regions, two adjacent edges of the capacitance compensation portions of the pixel electrodes have complementary patterns.

16. The liquid crystal display panel according to claim 8, wherein within two adjacent pixel regions, two adjacent edges of the capacitance compensation portions of the pixel electrodes have complementary patterns.

17. A display device, comprising a liquid crystal display panel, the liquid crystal display panel having a plurality of pixel regions arranged in an array, each of the pixel regions being divided into a light transmitting region and a shading region, each of the pixel regions being provided with a common electrode and a pixel electrode, wherein within at least one of the pixel regions, the pixel electrode has a capacitance compensation portion which extends in and occupies the shading region's entire area and is configured corresponding to a portion of the common electrode located within the shading region.

* * * * *